US011714095B2

(12) United States Patent
Tamezane et al.

(10) Patent No.: US 11,714,095 B2
(45) Date of Patent: Aug. 1, 2023

(54) ABNORMALITY DETERMINING METHOD, AND AUTOMATIC ANALYZER

(71) Applicant: Hitachi High-Tech Corporation, Tokyo (JP)

(72) Inventors: Hideto Tamezane, Tokyo (JP); Masaharu Nishida, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 257 days.

(21) Appl. No.: 17/273,822

(22) PCT Filed: Oct. 11, 2019

(86) PCT No.: PCT/JP2019/040146
§ 371 (c)(1),
(2) Date: Mar. 5, 2021

(87) PCT Pub. No.: WO2020/080271
PCT Pub. Date: Apr. 23, 2020

(65) Prior Publication Data
US 2021/0341502 A1 Nov. 4, 2021

(30) Foreign Application Priority Data
Oct. 17, 2018 (JP) ................ 2018-195477

(51) Int. Cl.
*G01N 35/00* (2006.01)
*G01N 21/77* (2006.01)
*G06F 17/18* (2006.01)

(52) U.S. Cl.
CPC ....... *G01N 35/00663* (2013.01); *G01N 21/77* (2013.01); *G06F 17/18* (2013.01); *G01N 2035/00673* (2013.01)

(58) Field of Classification Search
CPC ... G01N 35/00663; G01N 21/77; G06F 17/18
See application file for complete search history.

(56) References Cited

U.S. PATENT DOCUMENTS 9,310,388 B2 * 4/2016 Kamihara ........ G01N 35/00603
9,476,893 B2 * 10/2016 Mitsuyama ...... G01N 35/00663
(Continued)

FOREIGN PATENT DOCUMENTS

JP 2003-057248 A 2/2003
JP 2004-347385 A 12/2004
(Continued)

OTHER PUBLICATIONS

Extended European Search Report, dated Jun. 15, 2022, for European Application No. 19872752.1.
(Continued)

*Primary Examiner* — Bryan Bui
(74) *Attorney, Agent, or Firm* — Baker Botts L.L.P.

(57) ABSTRACT

The present invention relates to an improved abnormality determining method for an automatic analyzer and related automatic analyzer that detects abnormalities for a reaction process of a reaction solution. The method for determining the presence of absence of abnormalities in the reaction process and performs the determination by acquiring acquisition conditions for multiple items of measured data, acquiring the measured data detected by a spectral detector that match the acquisition conditions, calculating a feature quantity of the measured data, generating a determination criterion based on the feature quantity, and determining the presence or absence of abnormalities by comparing the feature quantity of the measured data subject to the determination with the determination criterion. The acquisition condition includes information relating to a number of a divisions of a measured value range and information relating to the number of items of data in each divided segment.

15 Claims, 7 Drawing Sheets

(56) References Cited

U.S. PATENT DOCUMENTS

| | | | |
|---|---|---|---|
| 2007/0166194 A1* | 7/2007 | Wakatake | G01N 35/0095 436/43 |
| 2009/0257051 A1 | 10/2009 | Kubota et al. | |
| 2012/0064636 A1 | 3/2012 | Mitsuyama et al. | |
| 2013/0122596 A1 | 5/2013 | Kamihara et al. | |

FOREIGN PATENT DOCUMENTS

| | | |
|---|---|---|
| JP | 2010-271095 A | 12/2010 |
| JP | 5562421 B2 | 7/2014 |

OTHER PUBLICATIONS

International Search Report, dated Dec. 10, 2019, for International Application No. PCT/JP2019/040146.

* cited by examiner

DATA ACWUISITION CONDITION SETTING SCREEN

| ITEM | ANALYSIS | ITEM CODE | MEASUREMENT VALUE RANGE | | | NUMBER OF ITEMS OF ACQUIRED DATA | NUMBER OF DIVISIONS OF DATA | NUMBER OF ITEMS OF DATA IN EACH DIVIDED SEGMENT | | | | | | | | | | ACQUISITION PERIOD |
|---|---|---|---|---|---|---|---|---|---|---|---|---|---|---|---|---|---|---|
| | | | | | | | | 1 | 2 | 3 | 4 | 5 | 6 | 7 | 8 | 9 | 10 | |
| AST | ✔ | 20501 | 3 | ~ | 480 | 200 | 3 | 140 | 40 | 20 | 0 | 0 | 0 | 0 | 0 | 0 | 0 | 3day |
| ALT | ✔ | 20705 | 0 | ~ | 1000 | 100 | 3 | 90 | 5 | 5 | 0 | 0 | 0 | 0 | 0 | 0 | 0 | 2day |
| ALP | ✔ | 20555 | 44 | ~ | 1500 | 100 | 3 | 80 | 16 | 4 | 0 | 0 | 0 | 0 | 0 | 0 | 0 | 3day |
| UA | | 20650 | | ~ | | | | | | | | | | | | | | |
| CRE | | 20851 | | ~ | | | | | | | | | | | | | | |
| TG | | 20903 | | ~ | | | | | | | | | | | | | | |

DATA PERIOD SETTING REGION

○ USE EXISTING DATA (ACQUIRED IN PAST)

○ USE NEWLY ACQUIRED DATA

SET

[FIG. 5]

UPDATE DETERMINATION CRITERION?

EXECUTE    STOP

ABNORMALITY DETERMINING METHOD, AND AUTOMATIC ANALYZER

TECHNICAL FIELD

The present invention relates to an abnormality determining method, and an automatic analyzer.

BACKGROUND ART

In a field of clinical examinations commencing with biochemical examinations, an automatic analyzer is generally used. In the automatic analyzer, a reagent that specifically reacts with a specific component contained in a biological sample (hereinafter referred to as a sample) such as blood or urine is added to and reacted with the sample, an absorbance and a luminescence amount of the reaction solution are measured, and thus a qualitative or quantitative analysis is performed. In recent years, with improvement of performance of the automatic analyzer, it becomes possible to analyze various items with high accuracy with a smaller amount of sample or reagent. On the other hand, an influence of factors that affect analysis performance, such as an operation error of each unit of the automatic analyzer and a change in a property of the reagent, has become large, and thus, it is required to maintain a state of the influence in a normal range, detect occurrence of an abnormality, and appropriately cope with the abnormality.

An example of a method of checking whether an analysis is correctly performed includes, for example, a method of detecting an abnormality based on an analysis of reaction process data. The reaction process data refers to time-series data of absorbance measured a plurality of times after the reagent is reacted with the sample. Clinical examination measurement methods roughly include an endpoint method and a rate method, and reaction process curves are different accordingly. The end point method is mainly used to measure concentrations of components such as proteins and lipids contained in a sample. Since a substance generated in a reaction between a component in the sample and the reagent asymptotically approaches a constant amount with time, a measurement value also asymptotically approaches a constant value with time. The rate method is mainly used to measure activity of an enzyme component contained in the sample, and an activity value of the enzyme component is measured instead of a concentration of the enzyme itself. The activity value is measured in a state in which the reagent and a certain amount of substrate are added to the sample, and an element that changes due to consumption of the substrate by the enzyme is measured by the reagent. When a substrate concentration is high to some extent, an enzyme reaction rate asymptotically approaches a theoretical upper limit value. A reagent for biochemical item measurement contains a sufficient amount of substrate. Therefore, as long as the reaction between the sample and the reagent is normally performed, the measurement value of the reaction linearly changes by a certain amount with respect to a time change. Related-art techniques of detecting an abnormality of reaction process data include, for example, a technique (see PTL 1) in which a linearity check for checking a linearity of a reaction process or a reference time-series data generated by using a chemical reaction model in advance is stored, reaction process data of a sample is compared with the reference time-series data and an abnormality is determined when the divergence is large, and a technique (see PTL 2) in which one approximation formula is selected from one or more approximation formulas each being for generating an approximate curve based on measurement point data, an approximate curve is generated based on a plurality of items of measurement point data, a shape feature quantity is calculated based on the approximate curve, and an abnormality determination is performed by using the shape feature quantity.

CITATION LIST

Patent Literature

PTL 1: JP-A-2004-347385
PTL 2: Japanese Patent No. 5562421

SUMMARY OF INVENTION

Technical Problem

However, in the automatic analyzer as in the related art described above, a determination criterion (an appropriate range of an absorbance to be measured) of the check of the reaction process is usually set in advance and provided to an operator, or is set by the operator when there is no setting. In this case, it is necessary to take variations into consideration due to factors such as machine differences, and the setting has a large tolerance, so that it cannot be said that an optimum determination criterion is always set.

In addition, in a case where sample data is acquired to set the determination criterion for each analyzer, a deviation occurs in a measured value of the acquired sample data, and a distribution of a feature quantity representing a feature of the reaction process cannot be correctly grasped in many cases. Therefore, it is difficult to set an optimum determination criterion.

In a view of such a situation, the present disclosure is to provide a technique for setting a more appropriate determination criterion for detecting an abnormality of an automatic analyzer.

Solution to Problem

In order to solve the above problems, an abnormality determining method according to a present embodiment is an abnormality determining method in which a determination criterion to be used to determine a presence or absence of an abnormality in a reaction process of a reaction solution including a sample and a reagent, in an automatic analyzer is generated, and the determination criterion is used to perform an abnormality determination, and the abnormality determining method includes: acquiring, by a processor which executes a prescribed operation, an acquisition condition for a plurality of items of measured data during the reaction process of the reaction solution; acquiring, by the processor, a plurality of items of measured data that are detected using a spectral detector, and that match the acquisition condition; calculating, by the processor, a feature quantity of the plurality of items of measured data; generating, by the processor, the determination criterion on the basis of the feature quantity of the plurality of items of measured data; and determining, by the processor, a presence or absence of an abnormality in the reaction process, by means of a comparison between the feature quantity of the measured data that is a subject of the determination, and the determination criterion. Further, the acquisition condition includes, at least, information relating to the number of divisions of a measured value range, and information relating to the number of items of data in each divided segment.

Advantageous Effect

According to the present disclosure, it is possible to set a more appropriate determination criterion for detecting an abnormality of an automatic analyzer.

DESCRIPTION OF EMBODIMENTS

The present embodiment discloses an abnormality determination process of a dispensing mechanism executed when a qualitative or quantitative analysis is performed on, for example, blood, urine, and other biological samples. Hereinafter, the embodiment will be described in detail with reference to the accompanying drawings. In the following embodiments, it is needless to say that constituent elements (including element steps and the like) are not necessarily essential unless otherwise particularly specified or clearly considered as essential in principle.

<Overall Configuration of Automatic Analyzer>

Figure 1:
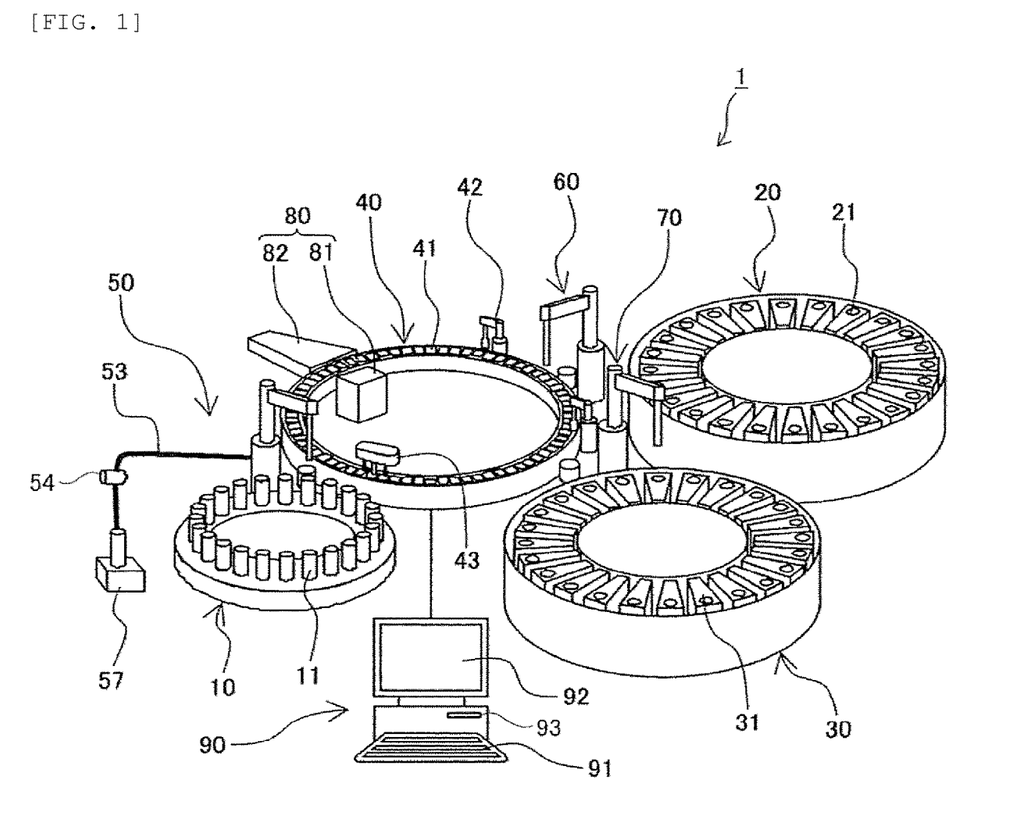
FIG. 1 is a diagram showing an example of a schematic configuration of an automatic analyzer 1 according to an embodiment of the present disclosure.

FIG. 1 is a diagram showing an example of a schematic configuration of an automatic analyzer 1 according to an embodiment of the present disclosure. In FIG. 1, the automatic analyzer 1 includes a sample disk (sample disk) 10, a first reagent disk 20, a second reagent disk 30, a reaction disk 40, a sample dispensing mechanism 50, a first reagent dispensing mechanism 60, a second reagent dispensing mechanism 70, a photometric mechanism 80, and a computing machine 90.

On the sample disk 10, a plurality of sample containers 11 each containing biological samples (hereinafter, referred to as samples) such as blood or urine to be analyzed are mounted adjacently in a circumferential direction. The sample disk 10 is rotationally driven by a rotation driving device (not shown), and transports the sample containers 11 in the circumferential direction of the sample disk 10.

On the first reagent disk 20, a plurality of reagent containers 21 each containing a reagent (first reagent) to be used for analysis of a sample are mounted adjacently in a circumferential direction. The first reagent disk 20 is rotationally driven by a rotation driving device (not shown) in the circumferential direction, and transports the reagent containers 21 in the circumferential direction of the first reagent disk 20.

On the second reagent disk 30, a plurality of reagent containers 31 each containing a reagent (second reagent) to be used for analysis of a sample are mounted adjacently in a circumferential direction. The second reagent disk 30 is rotationally driven by a rotation driving device (not shown) in the circumferential direction, and transports the reagent containers 31 in the circumferential direction of the second reagent disk 30.

On the reaction disk 40, a plurality of reaction containers 41 each containing a mixed solution (reaction solution) of the sample and the reagent are mounted adjacently in a circumferential direction. The reaction disk 40 is rotationally driven by a rotation driving device (not shown) in the circumferential direction, and transports the reaction containers 41 in the circumferential direction of the reaction disk 40. On a transport path of the reaction container 41 of the reaction disk 40, a stirring mechanism (including a cleaning bottle and a cleaning tank) 42 for stirring the mixed solution contained in the reaction container 41, and a cleaning mechanism 43 for cleaning the reaction container 41 for which the analysis is completed are disposed.

The sample dispensing mechanism 50 dispenses the sample by immersing a dispensing nozzle (not shown) in the sample to be dispensed contained in the sample container 11, absorbing the sample, and discharging the sample to the reaction container 41. The sample dispensing mechanism 50 is driven in horizontal and vertical directions by a driving device (not shown). The sample dispensing mechanism 50 includes a dispensing flow path 53, a pressure sensor 54, and a metering pump 57.

The first reagent dispensing mechanism 60 dispenses the first reagent by immersing a dispensing nozzle (not shown) in the first reagent to be dispensed contained in the reagent container 21, absorbing the first reagent, and discharging the first reagent to the reaction container 41. The first reagent dispensing mechanism 60 is driven in the horizontal and vertical directions by a driving device (not shown).

The second reagent dispensing mechanism 70 dispenses the second reagent by immersing a dispensing nozzle (not shown) in the second reagent to be dispensed contained in the reagent container 31, absorbing the second reagent, and discharging the second reagent to the reaction container 41. The second reagent dispensing mechanism 70 is driven in the horizontal and vertical directions by a driving device (not shown).

The photometric mechanism 80 is disposed on the transport path of the reaction container 41 in the reaction disk 40 and includes a light source 81 that emits light to the reaction container 41 containing the reaction solution to be measured, and a spectral detector 82 that detects transmitted light transmitted through the reaction solution contained in the reaction container 41. A detection result of the spectral detector 82 is converted into a digital signal and sent to the computing machine 90.

The computing machine 90 is implemented by a computer that controls operations of the entire automatic analyzer including the driving devices. The computing machine 90 executes control on such as an analysis process for analyzing a sample such as blood or urine to be analyzed, an abnormality determination process for performing an abnormality determination in a reaction process which is time-series data of an absorbance accompanying the analysis process, and the like. The computing machine 90 includes, for example, an input device 91 for inputting various setting values, commands, and the like, a display device 92 for displaying various setting screens, an analysis result screen, and the like, and a control device 93.

<Example of Internal Configuration of Computer>

Figure 2:
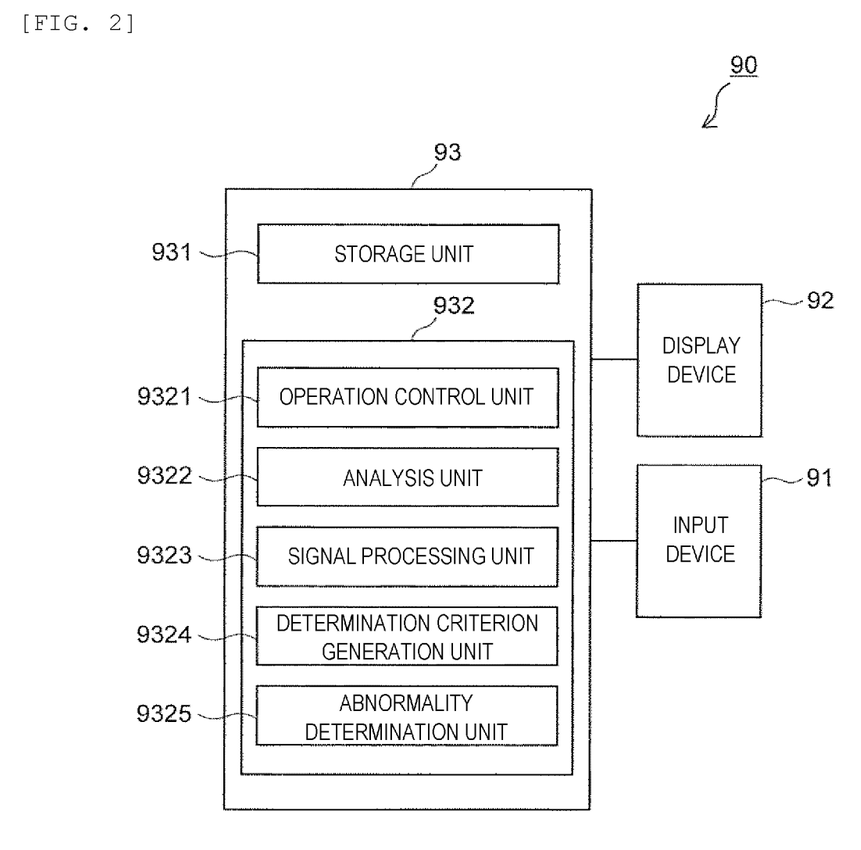
FIG. 2 is a block diagram showing an example of a schematic internal configuration (function) of a computing machine 90.

FIG. 2 is a block diagram showing an example of a schematic internal configuration (function) of the computing machine 90. In FIG. 2, the computing machine 90 includes the input device 91, the display device 92, and the control device 93. The control device 93 includes a storage unit (for example, implemented by a storage device such as a memory or an HDD) 931 that stores various programs, parameters, and the like, and a processor (for example, implemented by a CPU or an MPU) 932 that reads the various programs from the storage unit 931, expands the programs in an internal memory (not shown), and executes the various programs. FIG. 2 shows a state after each processing unit is developed as a program. Various types of information to be used for the operations of the automatic analyzer, such as the analysis process and the abnormality determination process, are stored.

The processor 932 includes various functional blocks implemented by a program, such as an operation control unit 9321 that controls the operations of the automatic analyzer, an analysis unit 9322 that calculates a component concentration of the sample, a signal processing unit 9323 that converts the digital signal obtained as the detection result of the spectral detector 82 into an absorbance and calculates a feature quantity, a determination criterion generation unit 9324 that generates a determination criterion based on the acquired feature quantity, and an abnormality determination unit 9325 that performs the abnormality determination process of determining whether a feature quantity to be determined is within the determination criterion by using the determination criterion generated by the determination criterion generation unit 9324 or a determination criterion stored in the storage unit 931 in advance.

<Analysis Process>

Next, basic operations of the analysis process of the automatic analyzer 1 according to the embodiment of the present disclosure will be described.

In the analysis process, a reagent that specifically reacts with a specific component contained in a sample such as blood or urine is added to and reacted with the sample, an absorbance of the reaction solution is measured, and then a qualitative and quantitative analysis is performed by the analysis unit 9322.

First, a sample to be analyzed (sample) is contained in the sample container 11 of FIG. 1, and the sample container 11 is mounted on the sample disk 10. Information (analysis items, reagent types, and the like) required for the analysis process of each sample is input in advance by an operator (user) using the input device 91 of the computing machine 90, and is stored in the storage unit 931.

Next, a certain amount of sample is absorbed from the sample container 11 by the dispensing nozzle (not shown) of the sample dispensing mechanism 50 and discharged to the reaction container 41 mounted on the reaction disk 40, thereby dispensing the sample.

Subsequently, the first and second reagent dispensing mechanisms 60, 70 dispense the reagent by absorbing a certain amount of reagent from the reagent containers 21, 31, and discharging the reagent to the reaction container 41 of the reaction disk 40, and stirring is performed by the stirring mechanism 42. A type, amount, timing, and the like of the reagent dispensed by the first and second reagent dispensing mechanisms 60, 70 are determined in advance in accordance with a type, analysis item, and the like of the sample.

Subsequently, the reaction disk 40 repeats rotation/stop periodically, and photometry is performed at a timing when the reaction container 41 passes between the photometric mechanism 80 (between the light source 81 and the spectral detector 82). The spectral detector 82 repeatedly performs the photometry during a predetermined reaction time, and then the cleaning mechanism 43 cleans the reaction container 41 for which the analysis is completed.

The photometric mechanism 80 performs the photometry on the plurality of sample containers 11 in parallel. The detection result obtained by the photometric mechanism 80 is sent to the analysis unit 9322 of the control device 93, and the component concentration corresponding to a type of the analysis (for example, qualitative analysis or quantitative analysis) is calculated and displayed on the display device 92.

<Determination Criterion Generation Process>

In the present embodiment, two types of determination criterion generation processes (examples 1, 2) will be described. A determination criterion generation process example 1 is an example in which a determination criterion is determined based on a feature quantity of sample data acquired according to an acquisition condition (to be described later). A determination criterion generation process example 2 is an example in which a regression formula (hereinafter, the regression formula can also be expressed as a regression line or a regression function, and the three are all synonymous concepts) is obtained based on a combination (correlation distribution) of feature quantities of sample data acquired according to an acquisition condition (to be described later), and a determination criterion is determined by setting a determination width for the regression formula.

(1) Determination Criterion Generation Process Example 1

Figure 3:
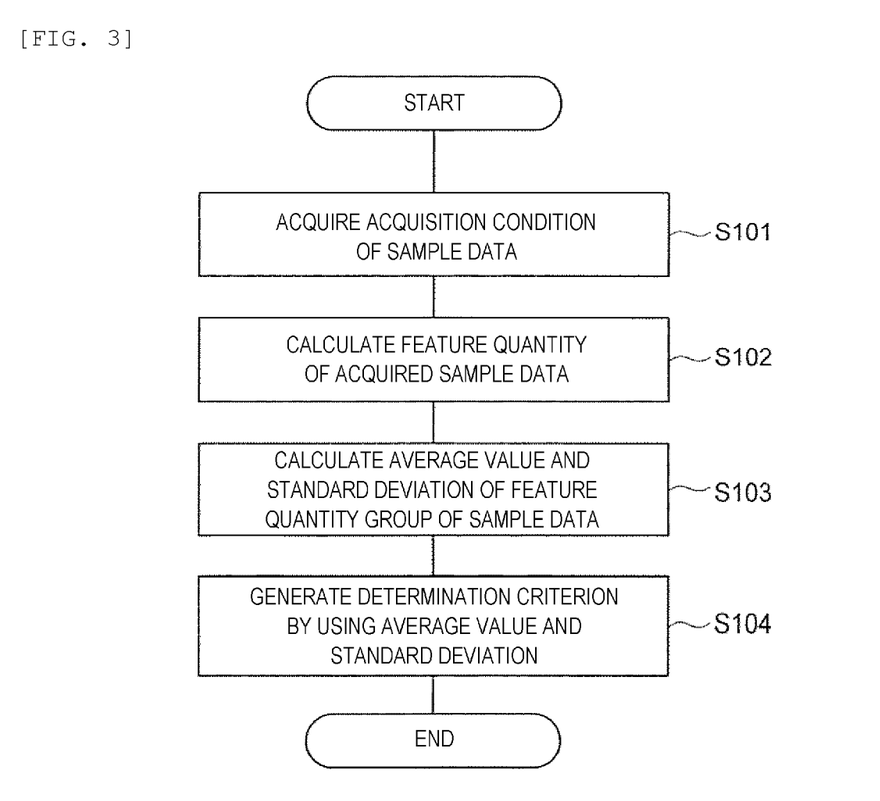
FIG. 3 is a flowchart illustrating details of a determination criterion generation process example 1 according to the present embodiment.

FIG. 3 is a flowchart illustrating details of the determination criterion generation process example 1 according to the present embodiment. In the following description, an operation subject of each step is the signal processing unit 9323 or the determination criterion generation unit 9324, but since the program is read and executed by the processor 932, the processor 932 may be the operation subject.

(i) Step 101

The determination criterion generation unit 9324 acquires information of an acquisition condition that indicates which kind of sample data (measured data) is to be acquired, and that is input by the operator from the input device 91, and stores the information in the storage unit 931.

Figure 4:
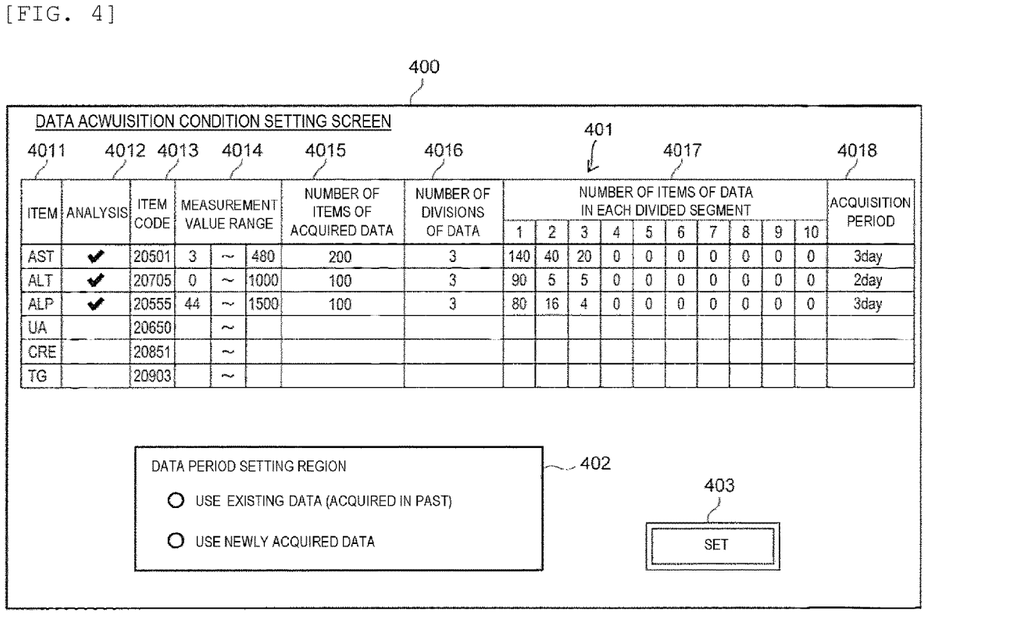
FIG. 4 is a diagram showing an acquisition condition input screen 400 (an example) for inputting an acquisition condition of sample data, which is displayed on a display device 92 of the computing machine 90.

FIG. 4 is a diagram showing an acquisition condition input screen 400 (an example) for inputting the acquisition condition of the sample data, which is displayed on the display device 92 of the computing machine 90. The acquisition condition input screen 400 includes, for example, an acquisition condition input region 401, a data period setting region 402, and a setting confirmation button display 403.

The acquisition condition input screen 400 includes, as configuration items, an item 4011 indicating an examination item such as blood sugar or protein, an analysis 4012 indicating whether or not to perform analysis when data is acquired, an item code 4013 indicating a code of the examination item, a measured value range 4014 indicating a data range acquired by concentration measurement (for example, values determined according to types of the sample and the reagent. A relationship between an absorbance and a concentration is specified in advance by calibration, and the concentration corresponding to the absorbance is known (there is a correlation between the absorbance and the concentration), the number of items of acquired data 4015 indicating the number of items of data acquired in the measurement range 4014, the number of divisions of data 4016 indicating the number of divided segments of the measurement range 4014, the number of items of data in each divided segment 4017, and an acquisition period 4018 defining a period for acquiring the number of items of data determined by the number of items of acquired data 4015. In this way, since the acquisition condition of the sample data to be used for generating the determination criterion can be designated, deviation of the sample data can be avoided, and an optimum determination criterion can be set for each automatic analyzer. In particular, in the present embodiment, the operator can set the number of items of acquired data 4015, the number of divisions of data 4016, and the number of items of data in each divided segment 4017 as the acquisition conditions. As a result, since the determination criterion is not generated only based on data in a vicinity of a specific concentration value (absorbance value) (the deviation of the acquired data is eliminated), the optimum determination criterion can be generated.

The data period setting region 402 is a region for instructing, during generation of the determination criterion, whether the operator uses sample data (measured data) already stored in the storage unit 931 or the sample data to be acquired from now on (newly acquired data, that is, sample data acquired after the conditions are designated), and is implemented by, for example, radio buttons. Either "use existing data" or "use newly acquired data" may be selected, or both of them may be selected, that is, the existing data may be used as a part of data, and the newly acquired data may be used as a remaining part of data.

The setting confirmation button display 403 is a button for confirming the settings after the acquisition condition input region 401 and the data period setting region 402 are input.

Figure 5:
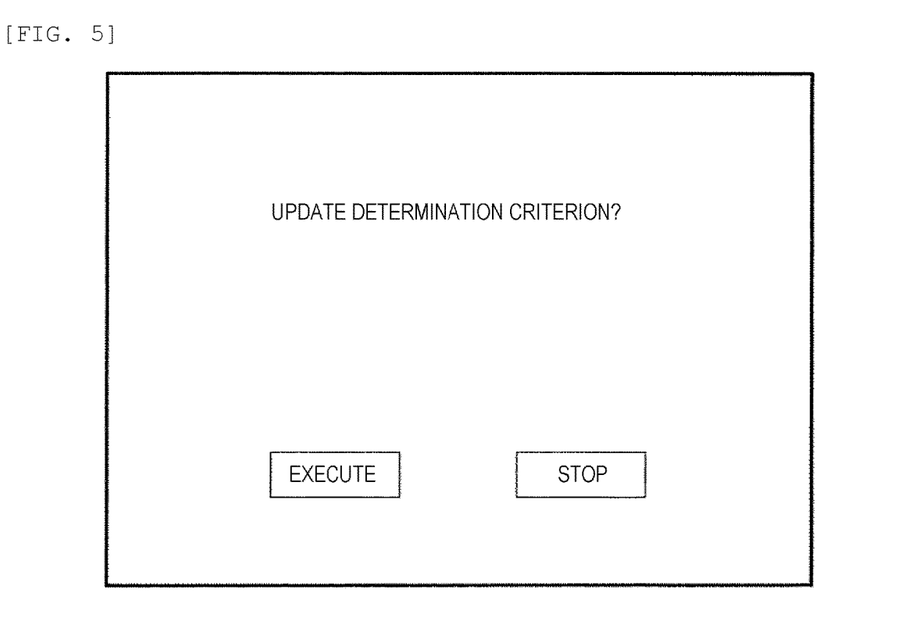
FIG. 5 is a diagram showing an example of a screen displayed when an update of the determination criterion is to be implemented in an input device 91 of the computing machine 90.

FIG. 5 is a diagram showing an example of a screen displayed when an update of the determination criterion is to be implemented in the input device 91 of the computing machine 90. When the operator is instructed to update the determination criterion from the input device 91, a graphic user interface (GUI) of FIG. 5 is displayed on the screen of the display device 92. Then, when the operator presses (clicks) an execution button, the acquisition condition input screen 400 (see FIG. 4) is displayed on the screen again, and a newly acquired condition or the like can be input. The determination criterion may be updated at any timing.

(ii) Step 102

The signal processing unit 9323 reads the set acquisition condition of the sample data from the storage unit 931, and acquires a digital signal corresponding to sample data matching the acquisition condition among the digital signals of the detection results obtained by the spectral detector 82. Then, the signal processing unit 9323 converts the digital signal of the sample data matching the acquisition condition into an absorbance to calculate a feature quantity, and stores the feature quantity in the storage unit 931. The feature quantity to be calculated is, for example, an average value at regular time intervals or a standard deviation value, an evaluation parameter calculated by approximating a plurality of items of measurement point data by an approximate function (approximation formula), a value set at a prescribed timing, or the like. The prescribed timing means a timing at which a graph shape of the absorbance changes depending on the reagent to be used or a graph shape has a feature depending on an examination item, but the feature is accurately captured during the reaction, and corresponds to, for example, a timing at which a slope of a graph changes. However, the feature quantity is not limited to those described above, and may be those capable of expressing the features in the reaction process.

Here, the evaluation parameter calculated by using the approximate function will be described as an example. As an approximate function, for example, functions represented by Equations (1) to (8) are assumed.

$$x = a*t + b + c*\exp(-k*t) \quad (1)$$

$$x = a*t + b + e/(t+d) \quad (2)$$

$$x = a*t + b + w/\{\exp(u*t) + v\} \quad (3)$$

$$x = a*t + b + p*\log\{1 + q*\exp(r*t)\} \quad (4)$$

$$x = a0 - a1*\exp(-k*t) \quad (5)$$

$$x = a0 - a1*\exp(-k1*t) - a2*\exp(-k2*t) \quad (6)$$

$$x = a + k/(t+b) \quad (7)$$

$$x = a + b/(\exp(k*t) + c) \quad (8)$$

In each function, t represents a time, and x represents the absorbance. In addition, a, b, c, d, e, k, p, q, r, u, v, w, a0, a1, k1, k2 represent approximation formula parameters.

As the evaluation parameter, for example, an average value of a difference (error) between an absorbance (approximate value) calculated by an approximation formula and an actually measured absorbance (actual measurement value), a root-means-square value ("Err") of the error, a maximum value of the error, or the like may be used. In addition, for example, as shown in Equations (9) and (10) below, values obtained by performing various calculations by combining the approximation formula parameters shown in Equations (1) to (8) may be used.

$$A0 = a0 - a1 \quad (9)$$

$$A1 = a1 + a2 \quad (10)$$

Equation (9) is an example of an equation for obtaining an evaluation parameter value, which indicates an initial absorbance (A0) of an endpoint method, by using the approximation formula parameter shown in Equation (5). Equation (10) is an example of an equation for obtaining an evaluation parameter value, which indicates an absorbance change amount (A1) of an endpoint method, by using the approximation formula parameter shown in Equation (6). In addition, for example, a parameter indicating a shape of a reaction process curve may be used.

(iii) Step 103

The determination criterion generation unit 9324 calculates an average value and a standard deviation (expressed as σ or SD) of a feature quantity group obtained by the calculation in step 102.

(iv) Step 104

The determination criterion generation unit 9324 sets, for example, the average value of the feature quantity±3SD of the feature quantity as the determination criterion by using the average value and the standard deviation calculated in step 103. The generated determination criterion is stored in the storage unit 931.

(2) Determination Criterion Generation Process Example 2

Figure 6:
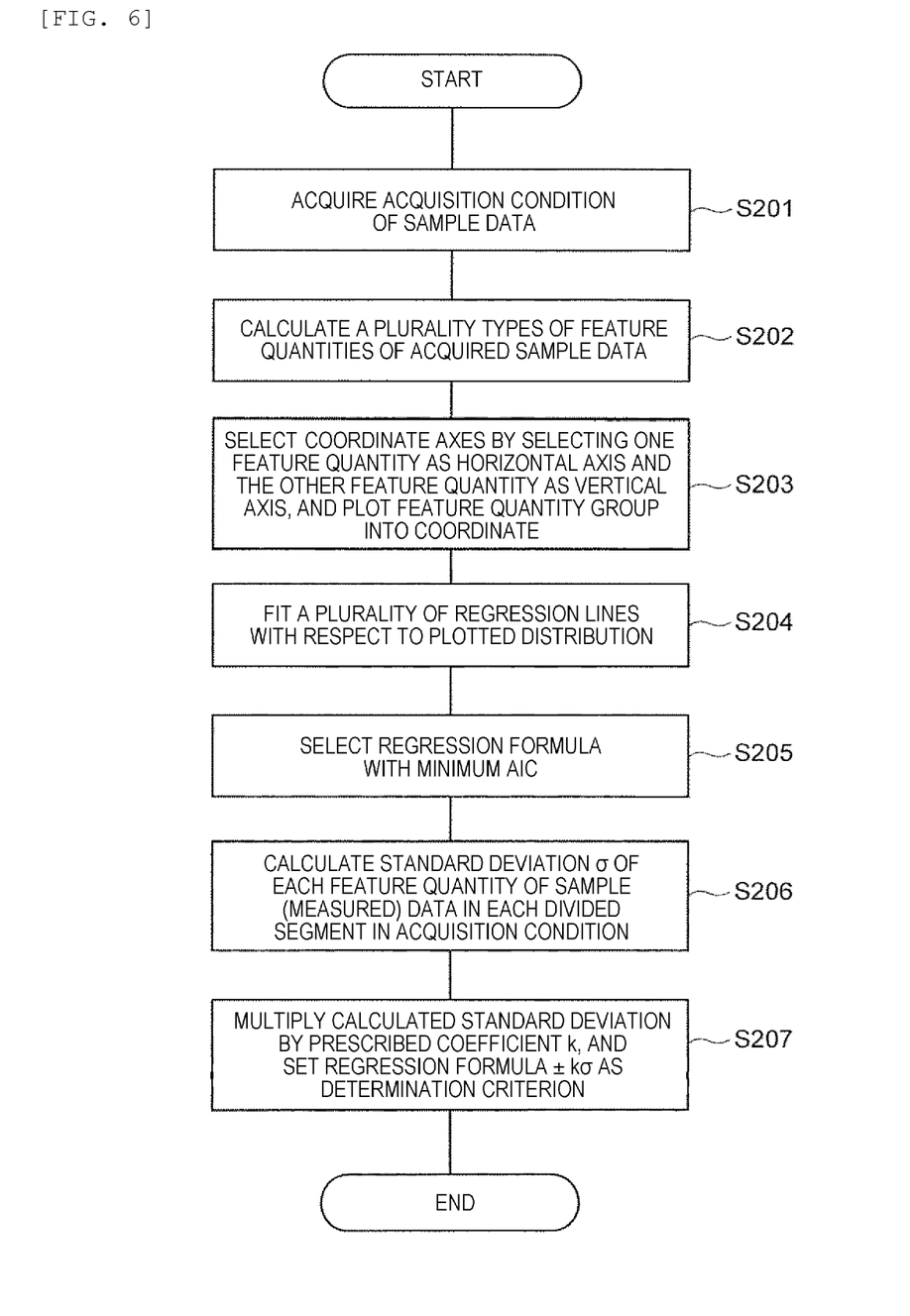
FIG. 6 is a flowchart illustrating details of a determination criterion generation process example 2 according to the present embodiment.

In the determination criterion generation process example 2, a feature quantity group is plotted, an optimum regression function expressing a distribution of the feature quantity group is selected, and the selected regression function is set as a determination criterion for an abnormality determination based on a curve corresponding to the selected regression function. FIG. 6 is a flowchart illustrating details of the determination criterion generation process example 2 according to the present embodiment. In the following description, an operation subject of each step is the signal processing unit 9323 or the determination criterion generation unit 9324, but since the program is read and executed by the processor 932, the processor 932 may be the operation subject.

(i) Step 201

The determination criterion generation unit 9324 acquires information of an acquisition condition that indicates which kind of sample data (measured data) is to be acquired, and that is input by the operator from the input device 91, and stores the information in the storage unit 931. The input of the acquisition condition is the same as that of the determination criterion generation process example 1, and thus the description thereof will be omitted.

(ii) Step 202

The signal processing unit 9323 reads the set acquisition condition of the sample data from the storage unit 931, and acquires a digital signal corresponding to sample data matching the acquisition condition among the digital signals of the detection results obtained by the spectral detector 82. Then, the signal processing unit 9323 calculates a plurality of feature quantities based on the digital signal of the sample data matching the acquisition condition. As the feature quantity, the same feature quantity as in the determination criterion generation processing example 1 can be used, and thus the description thereof will be omitted.

(iii) Step 203

The determination criterion generation unit 9324 selects two types of feature quantities (x, y) from the plurality of types of feature quantities calculated in step 202, and plots the calculated feature quantity group (x, y) on an XY coordinate plane in which one feature quantity is set as a horizontal axis and the other feature quantity is set as a vertical axis.

(iv) Step 204

The determination criterion generation unit 9324 prepares, for example, a 0-th order function, a linear function, a quadratic function, a logarithmic function, and an exponential function (five types) as regression formulas expressing the distribution of the feature quantity group, and fits the distribution of the feature quantity group as the regression formula by using these functions. The number of types of functions to be prepared is not limited to five. For example, when 100 pieces of sample data can be collected from each reaction process, each feature quantity can be calculated by 100. In step 203, a feature quantity A is set on a vertical axis (Y axis) and a feature quantity B is set on a horizontal axis (X axis), and values (x, y) (x corresponding to the feature quantity B and y corresponding to the feature quantity A) of the feature quantity of each sample are plotted on an XY coordinate plane to obtain a distribution. Then, in step 204, five regression formulas are obtained by curve fitting for this distribution.

(v) Step 205

The determination criterion generation unit 9324 compares akaike's information criteria (AIC) of all the five types of regression formulas, and selects a regression formula with the minimum AIC. The akaike's information criteria (AIC) are defined by the following formula.

$$AIC = -2\left\{-\frac{n}{2}(\log(2\pi\sigma^2)+1)\right\} + 2(P+1) \quad \text{[Formula 1]}$$

Here, P is the number of parameters (the number of coefficients of the regression function), and n is the number of items of data. The number of parameters P is one in a case of the 0-th order function, two in a case of the linear function, three in a case of the quadratic function, four in a case of the logarithmic function, and four in a case of the exponential function. In general, the larger the number of parameters is, the more suitable the regression function is for learning data. On the other hand, when conformity with the learning data is too good, prediction accuracy with respect to unknown data decreases. The AIC is used as an index indicating goodness of the regression function applied to the data distribution in consideration of the number of parameters when comparing regression performances of the regression functions having different numbers of parameters. The smaller the AIC is, the more suitable the regression function is for the data distribution.

(vi) Step 206

The determination criterion generation unit 9324 calculates a standard deviation σ of each feature quantity (feature quantities A and B in the above-described example) in each divided segment (see FIG. 4) set in the acquisition condition.

(vii) Step 207

The determination criterion generation unit 9324 multiplies the standard deviation of the feature quantity of each divided segment calculated in step 206 by a prescribed coefficient k, and generates a determination criterion by using the regression formula (regression function) obtained in step 205±k*σ. The generated determination criterion is stored in the storage unit 931.

<Effect of Determination Criterion Generation Process Example 2>

Figure 7:
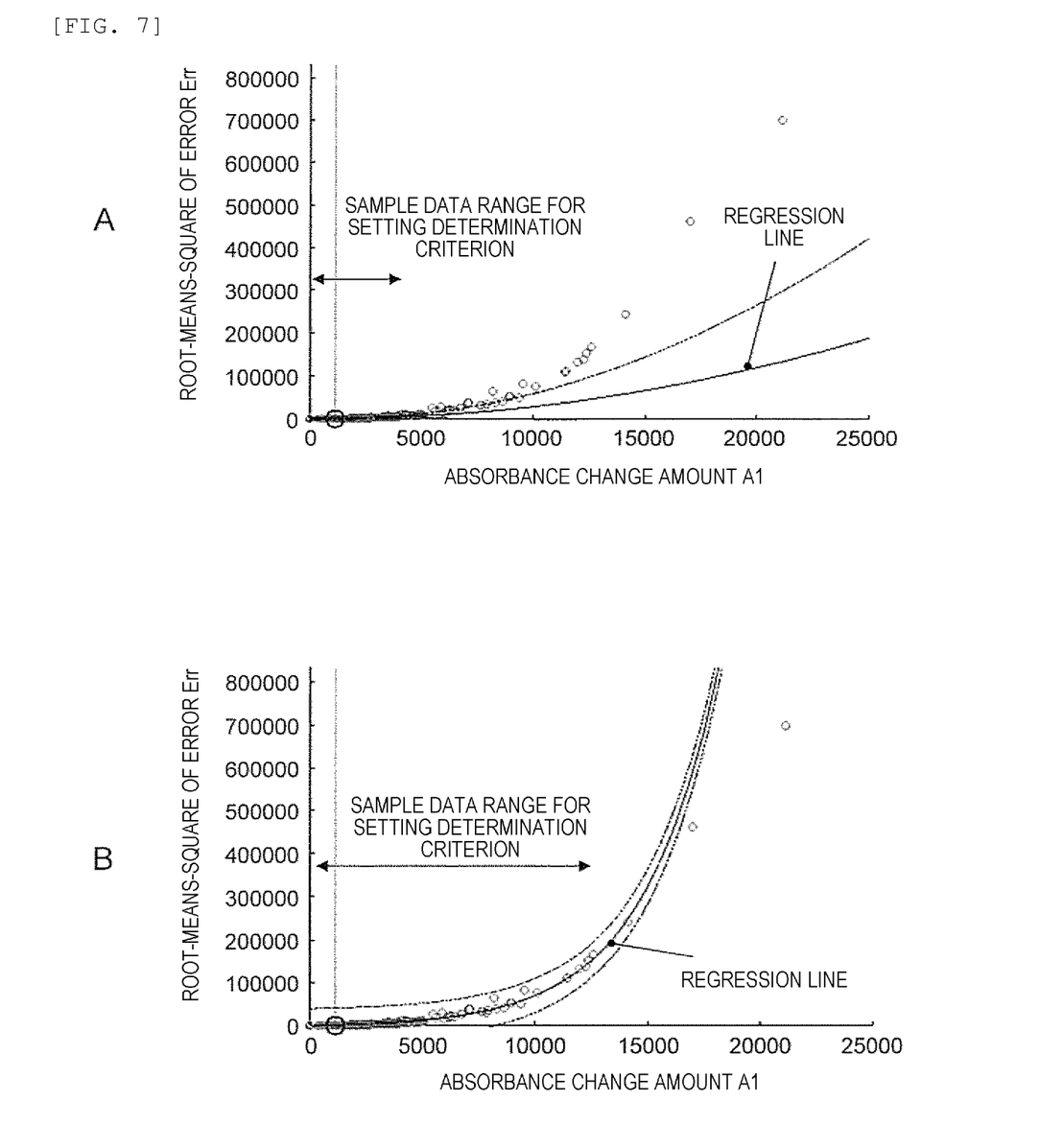
FIG. 7 is a diagram showing an effect obtained by setting the acquisition condition of the sample data (FIG. 4).

FIG. 7 is a diagram showing an effect obtained by setting the acquisition conditions of the sample data (FIG. 4). FIG. 7A shows an example of a regression line obtained when the acquisition condition of the sample data is not set, and FIG. 7B shows an example of a regression line obtained when the acquisition condition of the sample data is set. Here, the root-means-square of the error and the absorbance change amount are used as the feature quantities, but this is merely an example, any combination of feature quantities can be used, and the disclosure is not limited to a specific combination of feature quantities.

In FIG. 7, a case (the acquisition condition is not set) in which a certain number (for example, 100) of items of data is randomly extracted from a specified timing, and a case (the acquisition condition is set) in which a possible measured value range (for example, 29≤measurement range≤1076) of data (similarly, 100) is equally divided (for example, the number of divided segments=3), and a certain number (for example, set to 80, 10, and 10 for three segments that are set) of items of data is extracted in each segment are compared. When FIGS. 7A and 7B are compared with each other, it can be seen that a distribution of the feature quantity can be more appropriately grasped in the case in which the acquisition condition is set.

<Abnormality Determination Process>

Figure 8:
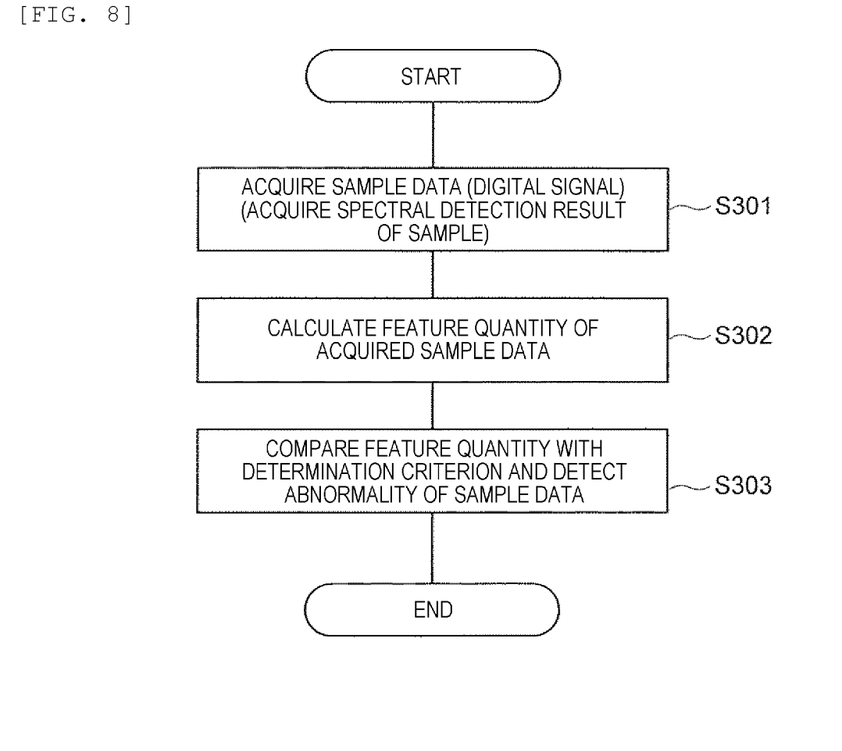
FIG. 8 is a flowchart illustrating details of an abnormality determination process according to the present embodiment.

FIG. 8 is a flowchart illustrating details of the abnormality determination process according to the present embodiment. In the following description, an operation subject of each step is the signal processing unit 9323 or the abnormality determination unit 9325, but since the program is read and executed by the processor 932, the processor 932 may be the operation subject.

(i) Step 301

The signal processing unit 9323 acquires sample data (digital signal) which is a detection (measurement) result obtained by the spectral detector 82.

(ii) Step 302

The signal processing unit 9323 calculates a feature quantity of the sample data acquired in step 301. A type of the feature quantity calculated in step 302 differs depending on the determination criterion to be used in the abnormality determination process, and here, a feature quantity of the same type as that of the feature quantity used when the determination criterion is generated is calculated. Accordingly, for example, the operator who recognizes the type of the feature quantity used when the determination criterion is generated may designate, by using the input device 91, the type of the feature quantity to be calculated, or the signal processing unit 9323 may check attribute information of data of the determination criterion held in the storage unit 931 to acquire information of a type of the feature quantity to be automatically calculated.

(iii) Step 303

The abnormality determination unit 9325 reads the determination criterion (the determination criterion generated by the determination criterion generation process 1 or 2) held in the storage unit 931. Then, the abnormality determination unit 9325 detects (determines) a presence or absence of an abnormality in the sample data (measured data) by comparing the feature quantity calculated in step 302 with the determination criterion. A portion where the abnormality is occurred can also be narrowed down by the feature quantity determined to be abnormal. When it is determined that there is no abnormality, the abnormality determination unit 9325 notifies the operation control unit 9321 that there is no abnormality. When it is determined that there is an abnormality, the abnormality determination unit 9325 notifies the operation control unit 9321 that there is an abnormality. In this case, the operation control unit 9321 generates an alarm on the display device 92, so as to prompt the operator or the like to confirm the automatic analyzer and the sample. Then, the operator confirms whether the abnormality is from the sample or the analyzer. When it is determined that the abnormality is from the analyzer, the analyzer can be repaired or the like.

Overview of Present Embodiment (i) According to the present embodiment, the automatic analyzer 1 is configured such that the operator can input, from a screen (GUI), conditions of sample data to be used during generation of the determination criterion. For example, the measured value range, the number of items of data, the number of divisions of range, the number of items of data in each segment, and the acquisition period can be designated as the conditions of the sample data, and the determination criterion is generated based on the sample data matching the conditions. As a result, the sample data can be acquired without any deviation, and the optimum determination criterion can be set for each analyzer.

(ii) More specifically, in the present embodiment, the determination criterion to be used for determining the presence or absence of the abnormality in the reaction process of the reaction solution containing the sample and the reagent in the automatic analyzer is generated, and the abnormality determination is performed by using the determination criterion. The abnormality determination process includes, for example: acquiring an acquisition condition for a plurality of items of measured data during the reaction process of the reaction solution; acquiring a plurality of items of measured data that are detected by using a spectral detector, and that match the acquisition condition; calculating a feature quantity of the plurality of items of measured data; generating the determination criterion on the basis of the feature quantity of the plurality of items of measured data; and determining a presence or absence of an abnormality in the reaction process, by means of a comparison between the feature quantity of the measured data that is a subject of the determination, and the determination criterion. Furthermore, as described above, the acquisition condition includes, at least, information relating to the number of divisions of a measured value range, and information relating to the number of items of data in each divided segment. In addition, the acquisition condition may include information relating to the number of items of data acquired in the measured value range and information relating to the acquisition period of the data. In this way, it is possible to set a more appropriate determination criterion for detecting an abnormality of the automatic analyzer. Therefore, the abnormality in the reaction process can be more reliably detected, and reliability of the measured data can be further improved.

The automatic analyzer according to the present embodiment provides a user interface capable of selecting whether to generate the determination criterion based on an existing data group stored in a storage device and/or to generate the determination criterion based on a measured data group acquired after the acquisition condition is set. Accordingly, it is possible to generate the determination criterion that is considered appropriately by the operator according to a situation.

Specifically, the determination criterion can be generated by calculating an average value and a standard deviation value of a feature quantity group of a plurality of items of measured data satisfying the acquisition condition and using the average value and the standard deviation value. In addition, a distribution indicating a correlation between at least two feature quantities among the feature quantity group of the plurality of items of measured data satisfying the acquisition condition may be generated, a regression function expressing the distribution may be generated, and the determination criterion may be generated based on a curve of the regression function. In the latter case, the regression function expressing the distribution indicating the correlation between at least two feature quantities can be selected from a 0-th order function, a linear function, a quadratic function, a logarithmic function, and an exponential function. Further, in the latter case, the akaike's information criteria obtained for all the regression functions are compared, and the determination criterion is generated by using the regression function with the minimum akaike's information criterion.

When it is determined that there is an abnormality in the reaction process, an alarm may be displayed on the display device. Therefore, the operator can quickly recognize the abnormality of the reaction solution in the reaction process.

(iii) Functions of the embodiment according to the present disclosure can be implemented by a program code of software. In this case, a storage medium recording the program code is provided to a system or a device, and a computer (or CPU or MPU) of the system or the device reads the program code stored in the storage medium. In this case, the program code itself read from the storage medium implements functions of the above embodiments, and the program code itself and the storage medium storing the program code constitute the present disclosure. As the storage medium to supply such a program code, for example, a flexible disk, a CD-ROM, a DVD-ROM, a hard disk, an optical disk, a magneto-optical disk, a CD-R, a magnetic tape, a nonvolatile memory card, or a ROM may be used.

An operating system (OS) or the like running on the computer may perform a part or all of an actual process based on an instruction of the program code, and the functions of the above embodiments may be implemented by the processing. Further, after the program code read from the storage medium is written in a memory of the computer, the CPU or the like of the computer may perform a part or all of the actual processing based on the instruction of the program code, and the functions of the above embodiments may be implemented by the processing.

Further, by distributing a program code of software for implementation of the functions of the embodiment via a network, the program code may be stored in a storage device such as a hard disk or a memory of a system or a device or in a storage medium such as a CD-RW or a CD-R, and a computer (or CPU or MPU) of the system or the device may read and execute the program code stored in the storage device or the storage medium during usage.

Finally, it is necessary to understand that processes and techniques described herein are not inherently relevant to any particular device and may be implemented by any suitable combination of components. Further, various types of devices for general purpose may be used in accordance with teachings described herein. It may be appreciated that it is beneficial to construct a specialized device to execute the steps of the method described herein. In addition, various inventions can be formed by appropriately combining a plurality of the constituent elements disclosed in the embodiments. For example, some constituent elements may be deleted from all the constituent elements disclosed in the embodiments. Further, the constituent elements in different embodiments may be appropriately combined. As described above, the present disclosure has been described with reference to specific examples, which are for illustrative purposes only and not for purposes of limitation. Those skilled in the art will recognize that there are many combinations of hardware, software, and firmware that are suitable for implementing the present disclosure. For example, the software may be implemented in a wide range of programs or scripting languages such as an assembler, C/C++, perl, Shell, PHP, and Java (registered trademark).

Further, in the above embodiments, a control line and an information line are considered to be necessary for description, and all control lines and information lines are not necessarily shown in a product. All of the configurations may be connected to each other.

In addition, other implementations of the present disclosure will be apparent to those with ordinary skill in the art from consideration of the specification and embodiments of the present disclosure. The various aspects and/or components of the embodiments can be used alone or in any combination in the automatic analyzer. The description and the specific examples are exemplary only, and a scope and a spirit of the present disclosure are shown in the following claims.

REFERENCE SIGNS LIST 1 automatic analyzer
10 sample disk (sample disk)
11 sample container
12 sample container rack
20 first reagent disk
21 reagent container
30 second reagent disk
31 reagent container
40 reaction disk
41 reaction container
42 stirring mechanism
43 cleaning mechanism
50 sample dispensing mechanism
53 dispensing flow path
54 pressure sensor
57 metering pump
60 first reagent dispensing mechanism
70 second reagent dispensing mechanism
80 photometric mechanism
90 computing machine
91 input device
92 display device
93 control device
931 storage unit
932 processor
9321 operation control unit
9322 analysis unit
9323 signal processing unit
9324 determination criterion generation unit
9325 abnormality determination unit

The invention claimed is:

1. An abnormality determining method in which a determination criterion to be used to determine a presence or absence of an abnormality in a reaction process of a reaction solution including a sample and a reagent, in an automatic analyzer is generated, and the determination criterion is used to perform an abnormality determination, the abnormality determining method comprising:
   acquiring, by a processor which executes a prescribed operation, an acquisition condition for a plurality of items of measured data during the reaction process of the reaction solution;
   acquiring, by the processor, a plurality of items of measured data that are detected using a spectral detector, and that match the acquisition condition;
   calculating, by the processor, a feature quantity of the plurality of items of measured data;
   generating, by the processor, the determination criterion on the basis of the feature quantity of the plurality of items of measured data; and
   determining, by the processor, a presence or absence of an abnormality in the reaction process, by means of a comparison between the feature quantity of the measured data that is a subject of the determination, and the determination criterion wherein a determination width is defined as a threshold that determines whether the feature quantity falls within or outside of a range defined by the determination width, wherein
   the acquisition condition includes, at least, information relating to the number of divisions of a measured value range, and information relating to the number of items of data in each divided segment.

2. The abnormality determining method according to claim 1, wherein
   the acquisition condition further includes information relating to the number of items of data acquired in the measured value range and information relating to an acquisition period of the data.

3. The abnormality determining method according to claim 1, further comprising:

providing, by the processor, a user interface capable of selecting whether to generate the determination criterion based on an existing data group stored in a storage device and/or to generate the determination criterion based on a measured data group acquired after the acquisition condition is set.

4. The abnormality determining method according to claim 1, wherein
the processor calculates an average value and a standard deviation value of a feature quantity group of the plurality of items of measured data satisfying the acquisition condition and uses the average value and the standard deviation value to generate the determination criterion.

5. The abnormality determining method according to claim 1, wherein
the processor generates a distribution indicating a correlation between at least two feature quantities among a feature quantity group of the plurality of items of measured data satisfying the acquisition condition, generates a regression function expressing the distribution, and generates the determination criterion based on a curve of the regression function.

6. The abnormality determining method according to claim 5, wherein
the processor selects the regression function, expressing the distribution indicating the correlation between at least two feature quantities, from a 0-th order function, a linear function, a quadratic function, a logarithmic function, and an exponential function.

7. The abnormality determining method according to claim 6, wherein
the processor compares akaike's information criteria obtained for all the regression functions, and uses a regression function with a minimum akaike's information criterion to generate the determination criterion.

8. The abnormality determining method according to claim 1, further comprising:
displaying, by the processor, an alarm on a display device when it is determined that there is an abnormality in the reaction process.

9. An automatic analyzer that performs a qualitative or quantitative analysis on a sample, the automatic analyzer comprising:
a spectral detector configured to acquire a plurality of items of measured data in a reaction process of a reaction solution contained in a reaction container in which a sample and a reagent are mixed and reacted with each other when the reaction solution is irradiated with light;
a storage device configured to store various programs for analyzing the sample; and
a processor configured to read the various programs from the storage device and execute a prescribed operation on the plurality of items of measured data based on the various programs, wherein
the processor is configured to execute the following processing:
acquisition of an acquisition condition for the plurality of items of measured data during the reaction process of the reaction solution containing the sample and the reagent,
acquisition of a plurality of items of measured data that are detected using the spectral detector, and that match the acquisition condition,
calculation of a feature quantity of the plurality of items of measured data,
generation of a determination criterion to be used in determination of a presence or absence of an abnormality in the reaction process of the reaction solution, on the basis of the feature quantity of the plurality of items of measured data; and
determination of a presence or absence of an abnormality in the reaction process by means of a comparison between the feature quantity of the measured data that is a subject of the determination, and the determination criterion wherein a determination width is defined as a threshold that determines whether the feature quantity falls within or outside of a range defined by the determination width, and
the acquisition condition includes, at least, information relating a measurement range, information relating to the number of divisions of a measured value range, and information relating to the number of items of data in each divided segment.

10. The automatic analyzer according to claim 9, wherein
the acquisition condition further includes information relating to the number of items of data acquired in the measured value range and information relating to an acquisition period of the data.

11. The automatic analyzer according to claim 9, wherein
the processor further executes processing of providing a user interface capable of selecting whether to generate the determination criterion based on an existing data group stored in a storage device and/or to generate the determination criterion based on a measured data group acquired after the acquisition condition is set.

12. The automatic analyzer according to claim 9, wherein
the processor calculates an average value and a standard deviation value of a feature quantity group of the plurality of items of measured data satisfying the acquisition condition and uses the average value and the standard deviation value to generate the determination criterion.

13. The automatic analyzer according to claim 9, wherein
the processor generates a distribution indicating a correlation between at least two feature quantities among a feature quantity group of the plurality of items of measured data satisfying the acquisition condition, generates a regression function expressing the distribution, and generates the determination criterion based on a curve of the regression function.

14. The automatic analyzer according to claim 13, wherein
the processor selects the regression function, expressing the distribution indicating the correlation between at least two feature quantities, from a 0-th order function, a linear function, a quadratic function, a logarithmic function, and an exponential function.

15. The automatic analyzer according to claim 14, wherein
the processor compares akaike's information criteria obtained for all the regression functions, and uses a regression function with a minimum akaike's information criterion to generate the determination criterion.

* * * * *